US009759284B2

United States Patent
Hagidaira et al.

(10) Patent No.: US 9,759,284 B2
(45) Date of Patent: Sep. 12, 2017

(54) DAMPING VALVE

(71) Applicant: KYB Corporation, Tokyo (JP)

(72) Inventors: Shinichi Hagidaira, Gifu (JP); Yoshifumi Kobayashi, Aichi (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/022,355

(22) PCT Filed: Sep. 9, 2014

(86) PCT No.: PCT/JP2014/073725
§ 371 (c)(1),
(2) Date: Mar. 16, 2016

(87) PCT Pub. No.: WO2015/041095
PCT Pub. Date: Mar. 26, 2015

(65) Prior Publication Data
US 2016/0223043 A1 Aug. 4, 2016

(30) Foreign Application Priority Data
Sep. 17, 2013 (JP) .................................. 2013-191336

(51) Int. Cl.
| F16K 31/126 | (2006.01) |
| F16F 9/34 | (2006.01) |
| F16F 9/46 | (2006.01) |
| F16F 9/50 | (2006.01) |
| F16K 31/06 | (2006.01) |

(52) U.S. Cl.
CPC .................. *F16F 9/34* (2013.01); *F16F 9/46* (2013.01); *F16F 9/50* (2013.01); *F16K 31/06* (2013.01)

(58) Field of Classification Search
CPC ....... F16F 9/34; F16F 9/50; F16F 9/46; F16K 31/06
USPC .......... 137/488, 487.5, 489.5, 492.5; 251/25, 251/318
See application file for complete search history.

(56) References Cited

U.S. PATENT DOCUMENTS 4,617,958 A * 10/1986 Seidel .................. G05D 16/163
137/488
5,960,915 A * 10/1999 Nezu ....................... F16F 9/325
188/266.6

(Continued)

FOREIGN PATENT DOCUMENTS

WO    WO 2012105556 A1    8/2012

*Primary Examiner* — Minh Le
(74) *Attorney, Agent, or Firm* — Rabin & Berdo, P.C.

(57) ABSTRACT

A damping valve includes a main valve opening and closing a main passage, and a pilot passage reducing a pressure of the upstream of the main passage by a throttle to guide as a back-pressure biasing the main valve to the closing direction. A pressure control valve being disposed on the downstream of the throttle and including a seating portion controlling the back-pressure, and a switching valve including a circular depressed portion opening and closing the pilot passage are integrated and controlled by a single solenoid. The damping valve includes fail passages being branched from the downstream of the throttle to bypass the main valve, and a fail valve opening and closing the fail passage. The switching valve is arranged on the upstream of the pressure control valve in the pilot passage. The fail passages are branched from the upstream of the switching valve of the pilot passage.

5 Claims, 9 Drawing Sheets

(56) References Cited

U.S. PATENT DOCUMENTS

| | | | | |
|---|---|---|---|---|
| 5,996,748 | A * | 12/1999 | Nezu | F16F 9/46 188/266.5 |
| 6,182,805 | B1 * | 2/2001 | Kashiwagi | F16F 9/325 188/266.6 |
| 6,584,999 | B2 * | 7/2003 | Inayama | G05D 16/2093 137/102 |
| 6,684,898 | B2 * | 2/2004 | Wiggins | F02C 7/277 137/15.25 |
| 7,147,430 | B2 * | 12/2006 | Wiggins | F01D 17/145 137/488 |
| 8,286,661 | B2 * | 10/2012 | Krake | F16K 31/1245 137/487 |
| 9,206,876 | B2 * | 12/2015 | Yamashita | F16F 9/3485 |
| 9,261,162 | B2 * | 2/2016 | Jee | F16F 9/464 |
| 9,285,006 | B2 * | 3/2016 | Katayama | F16F 9/325 |
| 9,447,835 | B2 * | 9/2016 | Kim | F16F 9/512 |
| 2013/0275003 | A1 | 10/2013 | Uchino et al. | |
| 2015/0076376 | A1 * | 3/2015 | Manger | F16K 31/0696 251/54 |
| 2016/0003320 | A1 * | 1/2016 | Kamakura | F16F 9/465 251/30.02 |
| 2016/0025176 | A1 * | 1/2016 | Kamakura | F16F 9/34 137/487.5 |
| 2016/0025177 | A1 * | 1/2016 | Abe | F16F 9/46 251/25 |
| 2016/0025178 | A1 * | 1/2016 | Kamakura | F16F 9/464 251/25 |
| 2016/0025237 | A1 * | 1/2016 | Mori | F16K 1/36 251/30.01 |

* cited by examiner

DAMPING VALVE

TECHNICAL FIELD

The present invention relates to a damping valve.

BACKGROUND ART

As a damping valve, there has been a variable damping valve that makes a damping force of a shock absorber, which is interposed between a vehicle body and axle shafts in a vehicle, variable. As this damping valve, for example, the applicant of the present application has been proposed a damping valve that includes a valve seat member, a main valve element, a pilot passage, an orifice, a spool, a valve housing, a pilot valve, and a solenoid. The valve seat member includes a port passing through from a cylinder to a reservoir and an annular valve seat surrounding the port. The main valve element is laminated on the valve seat member, and is seated on and separated from this annular valve seat to open and close the port. The pilot passage is branched from the upstream of the port. The orifice is disposed on the middle of the pilot passage. The spool has a tubular shape, and is in contact with the opposite side of the annular valve seat of the main valve element. The valve housing includes the spool slidably mounted on the outer periphery of the valve housing, and forms a back pressure chamber on the back side of the main valve element with the spool. The pilot valve is disposed on the downstream of the pilot passage. The solenoid adjusts a valve opening pressure of the pilot valve. This damping valve guides a secondary pressure that is downstream of the orifice in the pilot passage into the back pressure chamber to cause the secondary pressure to press the main valve element.

In this damping valve, the pilot valve is disposed on the downstream of the back pressure chamber. Then, adjusting the valve opening pressure of the pilot valve by a thrust of the solenoid controls the secondary pressure guided into the back pressure chamber to function as the valve opening pressure of the pilot valve.

On the back surface of the main valve element, the secondary pressure acts to press the main valve element on the annular valve seat side. On the front of the main valve element, a pressure to separate the main valve element from the annular valve seat acts from the upstream of the port. Accordingly, the damping valve opens when a force to separate the main valve element from the annular valve seat by the pressure on the upstream side of the port exceeds a force to press the main valve element on the valve seat by the secondary pressure.

That is, controlling the secondary pressure ensures the valve opening pressure of the main valve element to be adjusted. Adjusting the valve opening pressure of the pilot valve by the solenoid ensures a resistance provided to a flow of hydraulic oil passing through the passage by the damping valve to be variable. This causes the shock absorber to generate a desired damping force.

SUMMARY OF INVENTION

In this damping valve, adjusting the valve opening pressure of the pilot valve adjusts the damping force. However, when the solenoid cannot be energized, the pilot valve retreats maximally from the valve seat disposed in the middle of the pilot passage to function as a switching valve obstructing the downstream of the valve seat in the pilot passage.

On the other hand, this damping valve includes a fail passage branched on the downstream of the pilot valve in the pilot passage and on the upstream of the portion shut off by the pilot valve. When the pilot passage is shut off by retreating from the valve seat of the pilot valve, the secondary pressure is controlled by the fail valve disposed in the fail passage, and the valve opening pressure of the main valve element is set to a predetermined pressure. Accordingly, even in the failing, the damping valve can control the pressure in the back pressure chamber by the fail valve to generate the damping force.

The pilot valve is configured to integrate a pressure control valve, which controls the pressure in the back pressure chamber in the normal time, and the switching valve, which shuts off the pilot passage in the failing to make the fail passage effective. The function as the pressure control valve in the pilot valve is provided by controlling the valve opening pressure by the thrust of the solenoid and moving close to or away from the valve seat to keep the difference between the upstream pressure and the downstream pressure of the pilot passage constant. The function as the switching valve in the pilot valve is provided by obstructing the pilot passage such that the pilot valve abuts on a flange disposed on the inner periphery of the downstream of the pilot passage when the pilot valve retreats maximally from the valve seat. This ensures a single solenoid to execute a pressure control by the pressure control valve and a switching control of the pilot passage by the switching valve.

However, if the flow rate passing through the pilot valve from the upstream of the pilot passage increases, the differential pressure in the gap with the flange increases. This increases the pressure between the pressure control valve and the switching valve to press the pilot valve toward the flange side. Accordingly, even in the normal time, this possibly causes a transference to a fail state where the switching valve closes.

If the flow rate passing through the pilot valve from the upstream of the pilot passage decreases, the fail state can be recovered automatically to the normal state. However, in the fail state, the pressure in the back pressure chamber is controlled by the fail valve. Accordingly, this possibly makes the control by the pressure control valve ineffective and the damping force impossible to adjust until recovering to the normal state.

It is an object of the present invention to provide a damping valve that is configured to avoid uncontrollability of the damping force when transferring to the fail state in the normal time.

According to an aspect of the present invention, a damping valve, includes: a main passage; a main valve disposed on the main passage, the main valve being configured to open and close the main passage; a pilot passage including a throttle, the pilot passage being configured to reduce a pressure on an upstream of the main passage to guide as a back-pressure to bias the main valve to a closing direction; an electromagnetic valve including a pressure control valve and a switching valve, the electromagnetic valve being controlled by a single solenoid, the pressure control valve being disposed on a downstream of the throttle in the pilot passage to control the back-pressure, the switching valve being integrally disposed with the pressure control valve to open and close the pilot passage; a fail passage branched from the downstream of the throttle in the pilot passage, the fail passage bypassing the main valve; and a fail valve disposed on the fail passage, the fail valve being configured to open and close the fail passage. The switching valve is disposed on an upstream of the pressure control valve in the pilot passage. The fail passage is branched from an upstream of the switching valve in the pilot passage.

DESCRIPTION OF EMBODIMENTS

The following describes a damping valve V according to an embodiment of the present invention with reference to drawings.

Figure 1:
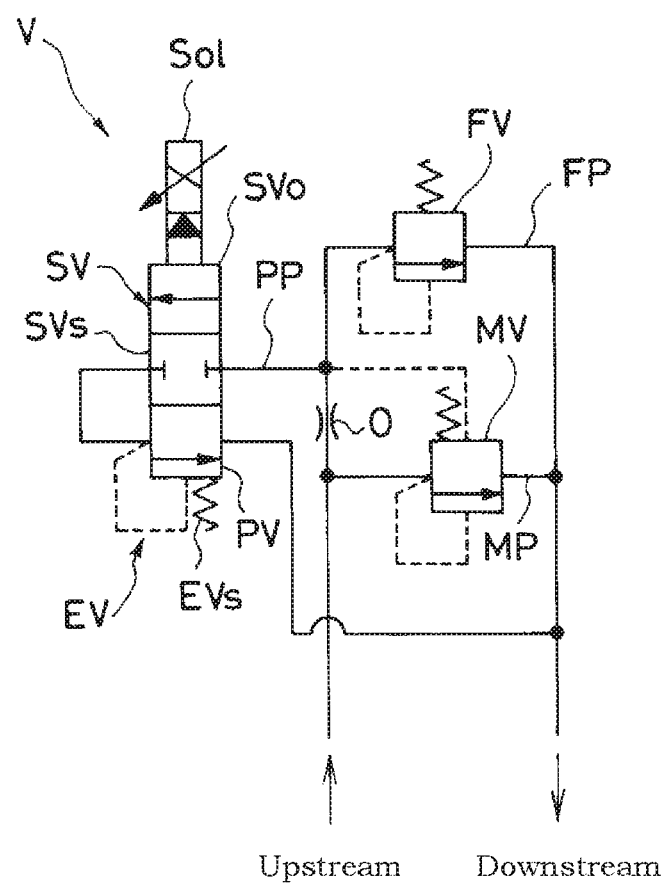
FIG. 1 is a circuit diagram of a damping valve according to an embodiment of the present invention.

As illustrated in FIG. 1, the damping valve V includes a main passage MP, a main valve MV, a pilot passage PP, an electromagnetic valve EV, a fail passage FP, and a fail valve FV. The main valve MV is disposed in the main passage MP to open and close the main passage MP. The pilot passage PP includes a throttle O, and reduces the pressure of the upstream in the main passage MP to guide as a back-pressure biasing the main valve MV to the closing direction. The electromagnetic valve EV includes a pressure control valve PV and a switching valve SV, and is controlled by a single solenoid Sol. The pressure control valve PV is disposed on the downstream of the throttle O in the pilot passage PP to control the back-pressure. The switching valve SV is disposed integrally with the pressure control valve PV to open and close the pilot passage PP. The fail passage FP is branched from the downstream of the throttle O in the pilot passage PP to bypass the main valve MV. The fail valve FV is disposed in the fail passage FP to open and close the fail passage FP.

The damping valve V is applied to a shock absorber D. The shock absorber D provides the resistance to a hydraulic fluid passing through the main passage MP mainly at the time of expansion and contraction to generate a damping force.

Figure 2:
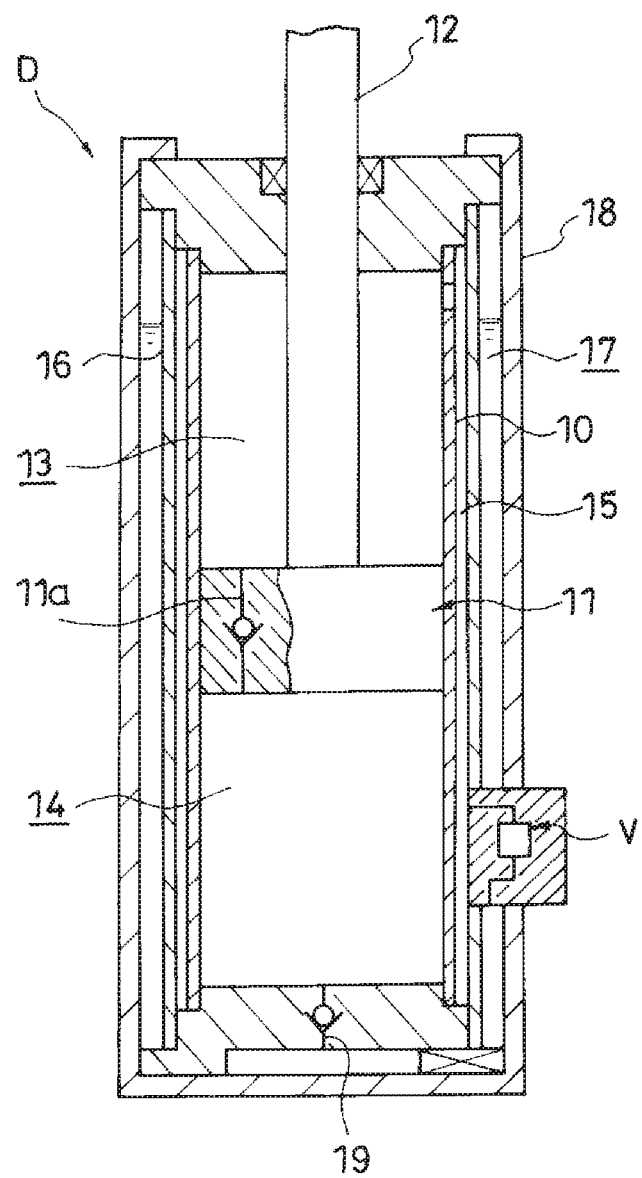
FIG. 2 is a cross-sectional view of a shock absorber to which the damping valve according to the embodiment of the present invention is applied.

As illustrated in FIG. 2, the shock absorber D to which the damping valve V is applied includes, for example, a cylinder 10, a piston 11, a rod 12, a rod-side chamber 13 and a piston-side chamber 14, an intermediate pipe 16, and an outer pipe 18. The piston 11 is slidably inserted into the cylinder 10. The rod 12 is moved to insert into the cylinder 10 to couple to the piston 11. The rod-side chamber 13 and the piston-side chamber 14 are defined by the piston 11 inserted into the cylinder 10. The intermediate pipe 16 covers the outer periphery of the cylinder 10 to form a discharge passage 15 between the cylinder 10 and the intermediate pipe 16. The outer pipe 18 covers the outer periphery of the intermediate pipe 16 to form a reservoir 17 between the intermediate pipe 16 and the outer pipe 18. In the shock absorber D, hydraulic oil is filled as a hydraulic fluid in the rod-side chamber 13, the piston-side chamber 14, and the reservoir 17. In the reservoir 17, a gas is also filled other than the hydraulic oil. It should be noted that, as the hydraulic fluid, a fluid that can generate the damping force may be employed other than the hydraulic oil.

The shock absorber D includes a suction passage 19 and a piston passage 11a. The suction passage 19 allows only a flow of the hydraulic oil from the reservoir 17 toward the piston-side chamber 14. The piston passage 11a is disposed on the piston 11, and allows only a flow of the hydraulic oil from the piston-side chamber 14 toward the rod-side chamber 13. The discharge passage 15 communicating with the rod-side chamber 13 is communicated with the reservoir 17 by the main passage MP. In the shock absorber D, the rod-side chamber 13 is the upstream of the main passage MP, and the reservoir 17 is the downstream of the main passage MP.

In the shock absorber D, when a compression operation is performed, the piston 11 moves to one direction (downward in FIG. 2) to compress the piston-side chamber 14. Then, the hydraulic oil in the piston-side chamber 14 moves to the rod-side chamber 13 through the piston passage 11a. In this compression operation, the rod 12 enters into the cylinder 10. Then, in the cylinder 10, the hydraulic oil becomes excessive by the volume of the rod 12 entering into the cylinder 10. Accordingly, the excessive hydraulic oil is extruded from the cylinder 10 to be discharged to the reservoir 17 through the discharge passage 15 and the main passage MP. The shock absorber D uses the damping valve V to provide the resistance to the flow of the hydraulic oil that moves to the reservoir 17 from the cylinder ho. This raises the pressure in the cylinder 10 to generate a pressure side damping force.

On the other hand, in the shock absorber D, when an expansion operation is performed, the piston 11 moves to the other direction (upward in FIG. 2) to compress the rod-side chamber 13. Then, the hydraulic oil in the rod-side chamber 13 moves to the reservoir 17 through the discharge passage 15 and the main passage MP. In this expansion operation, the piston 11 moves to the direction where the rod 12 retreats from the cylinder 10 to expand the volume of the piston-side chamber 14. In the piston-side chamber 14, the hydraulic oil is supplied from the reservoir 17 through the suction passage 19 by the volume of the expansion. The shock absorber D uses the damping valve V to provide the resistance to the flow of the hydraulic oil that moves to the reservoir 17 from the cylinder 10. This raises the pressure in the rod-side chamber 13 to generate an expansion side damping force.

As described above, the shock absorber D is a uniflow type shock absorber where, in the expansion and contraction operation, the hydraulic oil is discharged to the reservoir 17 from inside the cylinder 10 through the discharge passage 15, and the hydraulic oil circulates the piston-side chamber 14, the rod-side chamber 13, the discharge passage 15, and the reservoir 17 in order in one way. The shock absorber D can generate the damping forces of both the expansion and the pressure sides by single damping valve V since the hydraulic oil always passes through the damping valve V.

Next, a description will be given of the respective portions of the damping valve V in detail.

The main passage MP causes the rod-side chamber 13 in the cylinder 10 to communicate with the reservoir 17 through the discharge passage 15 of the shock absorber D. As illustrated in FIG. 1, the main valve MV is disposed on the middle of the main passage MP. On the main valve MV, the upstream side pressure acts in the opening direction, and the pressure on the upstream side of the main passage MP reduced by the throttle O acts as the back-pressure in the closing direction. On the main valve MV, a biasing force by a spring acts in the closing direction. Accordingly, if a valve-opening force by the pressure on the upstream side of the main passage MP overcomes a valve-closing force by the action of the back-pressure and the spring, the main valve MV is opened to provide the resistance to the flow of the hydraulic oil passing through the main valve MV.

The pilot passage PP is branched from the upstream of the main valve MV in the main passage MP to be connected to the reservoir 17. In the middle of the pilot passage PP, the throttle O constituted of such as an orifice or a choke is disposed. On the main valve MV, the pressure on the downstream of the throttle O acts as the back-pressure.

On the downstream side of the throttle O in the pilot passage PP, the electromagnetic valve EV where the pressure control valve PV and the switching valve SV are integrated is disposed. The pressure control valve PV is disposed in the middle of the pilot passage PP. To the pressure control valve PV, the pressure on the downstream of the throttle O in the pilot passage PP and on the upstream side of the pressure control valve PV, and the biasing force by a spring EVs act in the opening direction. To the pressure control valve PV, the thrust by the solenoid Sol acts in the closing direction. Accordingly, the pressure control valve PV can adjust the thrust of the solenoid Sol to vary the valve opening pressure. Accordingly, adjusting the valve opening pressure of the pressure control valve PV can control the pressure on the downstream of the throttle O in the pilot passage PP and on the upstream side of the pressure control valve PV to function as the valve opening pressure. It should be noted that, if the solenoid Sol is not energized, the pressure control valve PV makes the passage maximum by the biasing force of the spring EVs.

On the other hand, the switching valve SV is integrated with the pressure control valve PV. The switching valve SV is arranged on the downstream of the throttle O in the pilot passage PP and on the upstream of the pressure control valve PV. The switching valve SV includes a shutoff position SVs shutting off the pilot passage PP, and a communication position SVo opening the pilot passage PP. The switching valve SV is constantly biased to shift to the shutoff position SVs by the biasing force of the pressure control valve PV and the shared spring EVs. The switching valve SV is pushed by the thrust of the pressure control valve PV and the shared solenoid Sol to be shifted to the communication position SVo. The switching valve SV, in a state where the solenoid Sol can be normally energized, is pushed by the thrust of the solenoid Sol to be shifted to the communication position SVo opening the pilot passage PP.

It should be noted that, in a state where the solenoid Sol is not energized and in the fail state where the solenoid Sol cannot be energized, and cannot be normally energized, the electric power is not supplied to the solenoid Sol. In this case, the switching valve SV is pressed by the spring EVs to close the pilot passage PP.

Accordingly, in a state where the solenoid Sol can be normally energized, the electromagnetic valve EV can control the thrust of the solenoid Sol to maintain the switching valve SV at the communication position SVo and to control the pressure by the pressure control valve PV. In the fail state, while, since the solenoid Sol is not energized, the pressure control valve PV opens the passage maximally, since the switching valve SV is switched to the shutoff position SVs, the pilot passage PP is shut off.

On the electromagnetic valve EV, since the pressure control valve PV and the switching valve SV are integrated, not both the pressure control valve PV and the switching valve SV need to include the solenoid and the spring. Accordingly, commonalizing the solenoid Sol and the spring EVs ensures to reduce the cost, reduce the weight of the damping valve V, and reduce the size of the damping valve V considerably.

To the main valve MV, the pressure on the downstream of the throttle O in the pilot passage PP and on the upstream of the switching valve SV is guided as the back-pressure. Then, in a state where the switching valve SV opens the pilot passage PP, the pressure on the downstream of the throttle O in the pilot passage PP and on the upstream of the pressure control valve PV is the back-pressure guided to the main valve MV. Accordingly, in the normal time, adjusting the thrust of the solenoid Sol ensures to control the back-pressure acting to the main valve MV.

The fail passage FP is branched on the downstream of the throttle O in the pilot passage PP and on the upstream of the switching valve SV to communicate with the reservoir 17. In the middle of the fail passage FP, the fail valve FV is disposed. To the fail valve FV, the pressure on the downstream side of the throttle O in the pilot passage PP acts in the opening direction. On the other hand, to the fail valve FV, the biasing force by the spring acts in the closing direction. The fail valve FV is a relief valve opening when the pressure on the upstream of the fail valve FV reaches a predetermined valve opening pressure configured by the spring.

Disposing the fail valve FV ensures the fail valve FV to provide a relief function even when the pilot passage PP is shut off by the switching valve SV in the fail state. Accordingly, the pressure on the downstream of the throttle O in the pilot passage PP and on the upstream of the switching valve SV is controlled to be the valve opening pressure of the fail valve FV. In the failing, the back-pressure guided to the main valve MV is controlled to be the valve opening pressure of the fail valve FV. This also ensures the valve opening pressure of the main valve MV to be controlled to a predetermined pressure. Accordingly, even in the failing, the damping valve V can provide the resistance to the flow of the hydraulic oil passing through the main valve MV to generate the damping force.

As described above, on the damping valve V, the control of the electromagnetic valve EV can control the back-pressure for acting on the main valve MV to vary the damping force. The switching valve SV is disposed on the upstream of the pressure control valve PV in the pilot passage PP, and the fail passage FP is branched from the upstream of the switching valve SV. Accordingly, even if the switching valve SV and the pressure control valve PV are integrated, the pressure on the back side of the pressure control valve PV is not caused to be raised by the switching valve SV, thus avoiding the pressure for biasing the pressure control valve PV to the opening direction to switch the switching valve SV to the shutoff position SVs. On the pilot passage PP, even if the switching valve SV is disposed on the upstream of the pressure control valve PV, since the fail passage FP is branched from the upstream of the switching valve SV, the fail passage FP functions effectively, and does not lose the fail function.

Accordingly, the damping valve V ensures avoiding uncontrollability of the damping force when transferring to the fail state in the normal time.

On the damping valve V, the pressure control valve PV and the fail valve FV are arranged in parallel. Then, when the valve opening pressure of the fail valve FV is smaller than an upper limit pressure that the pressure control valve PV can control, even if the pressure control valve PV tries to control the back-pressure to be the upper limit pressure, the fail valve FV opens. In such setting, even in a state where the current provided to the solenoid Sol can be normally controlled, an upper limit of the back-pressure is limited by the valve opening pressure of the fail valve FV. Accordingly, it is preferable that the valve opening pressure of the fail valve FV is made to be larger than the upper limit pressure that the pressure control valve PV can control. Such setting ensures to provide a high damping force in the failing to stabilize a vehicle body posture more.

Figure 3:
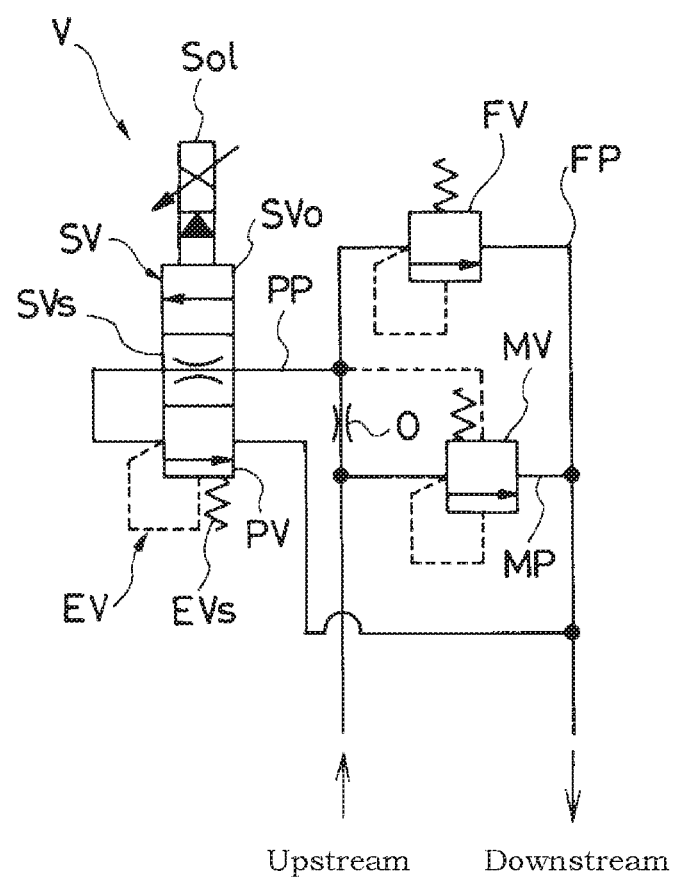
FIG. 3 is a circuit diagram of the damping valve according to a modification of the embodiment of the present invention.

Setting the valve opening pressure of the fail valve FV as described above makes the valve opening pressure of the main valve MV large. Then, in a region where the piston speed is low, the damping force of the shock absorber D might be excessive. In such case, as a modification illustrated in FIG. 3, when the switching valve SV is shifted to the shutoff position SVs, it is preferable that the pilot passage PP is not completely shut off, but is caused to function as the throttle. In this modification, the switching valve SV causes the shutoff position SVs to function as the orifice.

Figure 4:
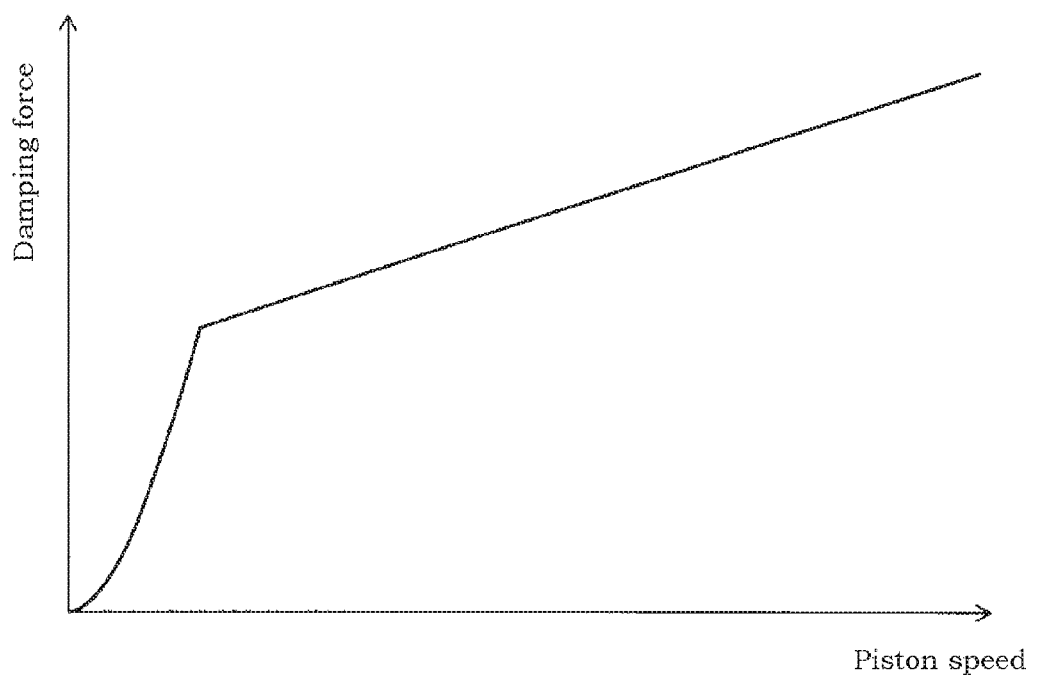
FIG. 4 is a diagram illustrating attenuation characteristics of the shock absorber to which the damping valve according to the modification of the embodiment of the present invention is applied.

If the switching valve SV causes the shutoff position SVs to function as the orifice, until the main valve MV opens, the hydraulic oil can bypass the main valve MV to move from the rod-side chamber 13 to the reservoir 17 through the throttle of the shutoff position SVs of the switching valve SV. Then, as illustrated in FIG. 4, in attenuation characteristics in the failing, a throttle property (an orifice property in this embodiment) can be added in a region where the piston speed of the shock absorber D is low. Accordingly, a vehicular ride quality in the failing can be improved.

As described above, the damping valve V has been described in principle. In the following, the specific configuration of the damping valve V will be described.

Figure 5:
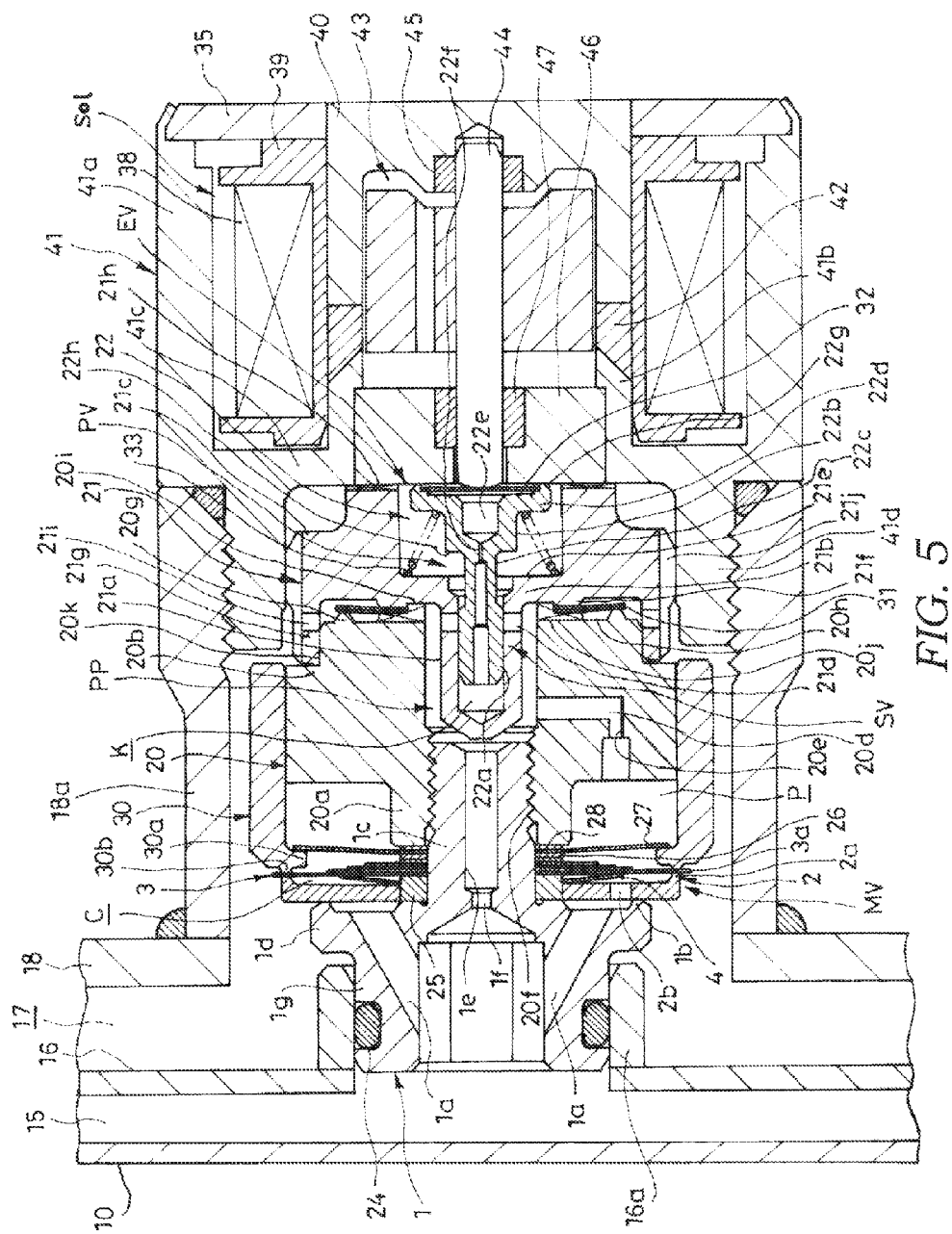
FIG. 5 is a diagram illustrating a specific configuration of the damping valve according to the embodiment of the present invention.

The damping valve V, as illustrated in FIG. 5, includes a main valve seat member 1, the main valve MV, the pilot passage PP, the electromagnetic valve EV, the fail passage FP, and the fail valve FV. The main valve seat member 1 includes a port 1a as a main passage. The main valve MV includes a main valve element 3 that opens and closes the port 1a. The pilot passage PP is branched from the upstream of the port 1a, and includes an orifice 1f as a throttle in the middle of the pilot passage PP to cause the orifice 1f to act the closing directional back-pressure to the main valve element 3. The electromagnetic valve EV includes the pressure control valve PV and the switching valve SV, and is controlled by the single solenoid Sol. The pressure control valve PV is disposed on the downstream of the orifice 1f in the pilot passage PP to control the back-pressure. The switching valve SV is integrally disposed with the pressure control valve PV to open and close the pilot passage PP. The fail passage FP (see FIG. 7) is configured by a groove 20j and a through hole 21i, which will be described later, and is branched from the downstream of the orifice 1f in the pilot passage PP to bypass the main valve MV. The fail valve FV (see FIG. 7) is disposed in the middle of the fail passage FP, is constituted by a fail valve element 31 and a fail valve seat 20g, which will be described later, and is opened by the predetermined pressure.

On the damping valve V, the main valve MV includes the main valve seat member 1, a sub valve element 2, the main valve element 3, a valve-element-between chamber C, a restrictive passage 2b, and a back pressure chamber P. The main valve seat member 1 is fitted to a sleeve 16a disposed on an opening portion of the intermediate pipe 16. The sub valve element 2 is mounted on the outer periphery of an assembling shaft 1c, which is disposed on the main valve seat member 1, in a floating state, and is seated on and separated from a sub valve seat 1b surrounding the port 1a of the main valve seat member 1. The main valve element 3 is similarly mounted on the outer periphery of the assembling shaft 1c disposed on the main valve seat member 1. The valve-element-between chamber C is formed between the sub valve element 2 and the main valve element 3. The restrictive passage 2b causes the port 1a to communicate with the valve-element-between chamber C. The back pressure chamber P is disposed on the opposite side of the main valve seat member 1 on the main valve element 3, and biases the main valve element 3 and the sub valve element 2 to the main valve seat member 1 side with the back-pressure, which is introduced by reducing the pressure of the port 1a via the pilot passage PP.

As illustrated in FIG. 5, the main valve seat member 1 includes a base portion 1d, the assembling shaft 1c, a hollow portion 1e, the orifice 1f, the plurality of ports 1a, and the circular sub valve seat 1b. The base portion 1d has a large diameter and is fitted inside the sleeve 16a. The assembling shaft 1c projects from the base portion 1d in the axial direction (rightward in FIG. 5). The hollow portion 1e is disposed to pass through the base portion 1d and the assembling shaft 1c in the axial direction, and forms a part of the pilot passage PP. The orifice 1f is the throttle disposed in the middle of the hollow portion 1e. The plurality of the ports 1a passes through the base portion 1d from one end (left end in FIG. 5) to the other end (right end in FIG. 5). The sub valve seat 1b is disposed on the other end (right end in FIG. 5) of the base portion 1d, and on the outer periphery side of the outlet of the port 1a.

The port 1a passes through the base portion 1d as described above. An opening of the port 1a disposed on the one end (left end in FIG. 5) side of the base portion 1d communicates with inside the rod-side chamber 13 through the discharge passage 15 formed by the intermediate pipe 16. An opening of the port 1a disposed on the other end (right end in FIG. 5) side of the base portion 1d communicates with the reservoir 17. That is, the shock absorber D discharges the hydraulic oil to the reservoir 17 from the rod-side chamber 13 through the discharge passage 15 and the port 1a at the time of expansion and contraction. At this time, the upstream of the port 1a is the rod-side chamber 13, and the downstream is the reservoir 17. An opening of the hollow portion 1e disposed on the one end (left end in FIG. 5) side communicates with inside the rod-side chamber 13 through the discharge passage 15 as well as the port 1a.

It should be noted that, the main valve seat member 1 includes a small-diameter portion 1g formed by making the one end side (left side in FIG. 5) of the base portion 1d in a small diameter. The small-diameter portion 1g fits to inside the sleeve 16a. On the outer periphery of the small-diameter portion 1g, a seal ring 24 is mounted to seal between the sleeve 16a and the small-diameter portion 1g. Then, the discharge passage 15 is configured not to communicate with the reservoir 17 through the outer periphery of the base portion 1d.

On the other end (right end in FIG. 5) of the base portion 1d of the main valve seat member 1, the sub valve element 2 that is seated on and separated from the sub valve seat 1b to open and close the port 1a is laminated. The sub valve element 2 is ring-shaped, and includes a circular main valve seat 2a and the restrictive passage 2b. The main valve seat 2a is disposed on the opposite side of the main valve seat member 1, and projects. The restrictive passage 2b opens from the inner peripheral side of the main valve seat 2a, and communicates with the side surface of the main valve seat member 1. In a state where the sub valve element 2 is seated on the sub valve seat 1b, the outlet end of the port 1a is obstructed by the sub valve element 2. The restrictive passage 2b provides the resistance to the flow of the hydraulic oil passing through the restrictive passage 2b. Although details will be described below, when the hydraulic oil that passed through the port 1a passes the restrictive passage 2b to move to the opposite side of the main valve seat member 1, which is the back side of the sub valve element 2, a differential pressure is generated between the main valve seat member 1 side, which is the front side of the sub valve element 2, and the back side.

The sub valve element 2 is slidably mounted on the outer periphery of a circular spacer 25, which is mounted on the outer periphery of the assembling shaft 1c of the main valve seat member 1. The spacer 25 is configured such that the thickness of the spacer 25 in the axial direction is larger than the thickness of the inner periphery of the sub valve element 2 in the axial direction. The sub valve element 2 can move in the axial direction (right-left direction in FIG. 5) on the outer periphery of the spacer 25. Accordingly, the sub valve element 2 is assembled to the main valve seat member 1 in a floating state, and can move close to or away from the main valve seat member 1 to be seated on and separated from the sub valve seat 1b. The sub valve element 2 opens the port 1a after separating from the sub valve seat 1b.

On the back side of the sub valve element 2, the main valve element 3 is laminated. Between the main valve element 3 and the spacer 25, a disc spring 4 as a spring member to bias the sub valve element 2 toward the sub valve seat 1b is interposed. The main valve element 3 is a circular laminated leaf valve which inner periphery is assembled to the assembling shaft 1c. The main valve element 3 is sandwiched by the spacer 25 and a valve housing 20 that is screw-fastened to the assembling shaft 1c. Accordingly, the main valve element 3 is allowed a deflection on the outer periphery side to be ensured to seat on and separate from the main valve seat 2a of the sub valve element 2.

The inner periphery of the main valve element 3 is laminated on the spacer 25, and the outer periphery is seated on the main valve seat 2a. Then, between the main valve element 3 and the sub valve element 2, a space exists. This space is the valve-element-between chamber C. The valve-element-between chamber C communicates with the port 1a via the restrictive passage 2b. When the main valve element 3 is deflected by the pressure acting to the inside of the valve-element-between chamber C through the restrictive passage 2b to separate from the main valve seat 2a, the ring-shaped gap is formed between the main valve element 3 and the sub valve element 2. This ensures the hydraulic oil that passed through the port 1a and the restrictive passage 2b to move to the reservoir 17 passing between the main valve element 3 and the sub valve element 2. That is, even if the sub valve element 2 is seated on the sub valve seat 1b, when the main valve element 3 deflects to separate from the main valve seat 2a, the port 1a is opened to communicate with the reservoir 17. Thus, the main valve element 3 can open and close the port 1a.

When the main valve element 3 deflects and the sub valve element 2 is pushed up by the pressure receiving from the port 1a, the entire sub valve element 2 slides on the spacer 25 to separate from the sub valve seat 1b. In this case, the hydraulic oil that passed through the port 1a is discharged to the reservoir 17 via the ring-shaped gap generated between the sub valve element 2 and the sub valve seat 1b. It should be noted that, the main valve element 3 is a laminated leaf valve where a plurality of annular plates are laminated, and the number of the annular plates is arbitrary. On the outer periphery of the annular plate seating on the main valve seat 2a, a cutout orifice 3a is disposed. The orifice may be formed by such as a cutout on the main valve seat 2a of the sub valve element 2 instead of the main valve element 3 to be disposed, or may be disposed on a contacting portion of the main valve seat member 1 to the sub valve seat 1b or a contacting portion of the sub valve element 2 to the main valve seat 2a. It should be noted that the restrictive passage 2b is easily processed by being disposed on the sub valve element 2. However, since the restrictive passage 2b may cause the front view side of the sub valve element 2 to communicate with the back side, the restrictive passage 2b can be disposed on except for the sub valve element 2.

On the other end side (right side in FIG. 5) of the main valve element 3, a distance piece 26, a circular plate spring 27 and a distance piece 28 are laminated in order. The distance piece 26, the circular plate spring 27, and the distance piece 28 are assembled to the assembling shaft 1c. On the distal end (right end in FIG. 5) of the assembling shaft 1c, the valve housing 20 is screwed. This causes the spacer 25, the main valve element 3, the distance piece 26, the plate spring 27, and the distance piece 28, which are assembled to the assembling shaft 1c, to be sandwiched by the base portion 1d of the main valve seat member 1 and the valve housing 20 to be secured. It should be noted that, the sub valve element 2 mounted on the outer periphery of the spacer 25 is disposed on the outer periphery of the spacer 25 in a floating state, and is movable in the axial direction. The plate spring 27 is disposed such that the inner periphery of the plate spring 27 is secured to the assembling shaft 1c and the outer periphery is a free end.

As illustrated in FIG. 5, the valve housing 20 is in a cylindrical shape, and includes a small-diameter pipe portion 20a, a large-diameter pipe portion 20b, a pressure introduction horizontal hole 20d, and a pressure introduction vertical hole 20e. The small-diameter pipe portion 20a is disposed on the one end side (left side in FIG. 5) and has a small outer diameter. The large-diameter pipe portion 20b is disposed on the other end side (right side in FIG. 5) and has a large outer diameter compared with the small-diameter pipe portion 20a. The pressure introduction horizontal hole 20d passes to the inner periphery of the large-diameter pipe portion 20b. The pressure introduction vertical hole 20e opens on the one end (left end in FIG. 5) of the large-diameter pipe portion 20b and communicates with the pressure introduction horizontal hole 20d. Inserting and screwing the assembling shaft 1c of the main valve seat member 1 into a screw hole portion 20f, which is disposed inside the small-diameter pipe portion 20a, causes the valve housing 20 to be coupled to the main valve seat member 1.

It should be noted that the pressure introduction horizontal hole 20d and the pressure introduction vertical hole 20e may be formed as a single hole.

On the other end (right end in FIG. 5) of the large-diameter pipe portion 20b, the circular fail valve seat 20g of the fail valve FV, a ring-shaped window 20h, a ring-shaped protrusion 20i, and the groove 20j are disposed. The ring-shaped window 20h is disposed on the inner periphery of the fail valve seat 20g. The ring-shaped protrusion 20i is disposed on the inner periphery of the ring-shaped window 20h. The groove 20j communicates with the ring-shaped window 20h from the inner periphery.

The valve housing 20 includes a cylindrical spool 30 slidably mounted on the outer periphery of the large-diameter pipe portion 20b. The spool 30 is formed in a pipe shape. The spool 30 includes a flange 30a and a ring-shaped protrusion 30b. The flange 30a projects from the one end (left end in FIG. 5) to the inner periphery. The ring-shaped protrusion Sob projects from also the one end to the axial direction. The spool 30 is movable in the axial direction (right-left direction in FIG. 5) with respect to the valve housing 20.

On the inside end portion of the flange 30a (right end portion in FIG. 5), the outer periphery of the plate spring 27 abuts. The spool 30 is biased toward the main valve element 3 side (left side in FIG. 5) by the plate spring 27. The ring-shaped protrusion Sob abuts on the side face of the main valve element 3.

The spool 30 defines the back pressure chamber P between the spool 30 and the valve housing 20. The one end of the back pressure chamber P (left end in FIG. 5) is obstructed by the plate spring 27. The other end of the back pressure chamber P (right end in FIG. 5) communicates with the inside of the valve housing 20 through the pressure introduction vertical hole 20e and the pressure introduction horizontal hole 20d.

The inside of the valve housing 20 passes to the hollow portion 1e of the main valve seat member 1, and communicates with the inside of the rod-side chamber 13 as the upstream of the port 1a through the orifice 1f. Then, the hydraulic oil discharged from the rod-side chamber 13 is guided to the back pressure chamber P via the orifice 1f. That is, the pressure of the upstream of the port 1a is reduced by the orifice 1f to be guided to the back pressure chamber P.

According to the above description, on the back surface of the main valve element 3, other than the biasing force of the plate spring 27 to bias the spool 30, the biasing force to press the main valve element 3 toward the sub valve element 2 by the internal pressure of the back pressure chamber P acts. That is, in the expansion and contraction operation of the shock absorber D, the sub valve element 2 receives the pressure inside the rod-side chamber 13 from the front side via the port 1a, and receives the internal pressure of the back pressure chamber P and the biasing force of the plate spring 27 from the back side through the main valve element 3 in addition to the biasing force of the disc spring 4.

The main valve element 3 receives a force obtained by multiplying the inner diameter cross-sectional area of the other end side (right side in FIG. 5) of the flange 30a of the spool 30 by the pressure of the back pressure chamber P in the direction pressing to the sub valve element 2. The main valve element 3 receives a force obtained by multiplying the inner diameter cross-sectional area of the main valve seat 2a by the pressure of the valve-element-between chamber C in the direction away from the sub valve element 2. An intensification ratio that is a ratio of the pressure inside the back pressure chamber P to the valve opening pressure of the main valve element 3 is decided by the ratio of the inner diameter cross-sectional area of the other end side (right side in FIG. 5) of the flange 30a of the spool 30 to the inner diameter cross-sectional area of the main valve seat 2a. It should be noted that a hole may be disposed on the plate spring 27 to cause the pressure inside the back pressure chamber P to directly act to the main valve element 3.

When the pressure inside the rod-side chamber 13 increases the pressure inside the valve-element-between chamber C, and the force to deflect the outer periphery of the main valve element 3 toward the other direction (rightward in FIG. 5) overcomes the resultant force of the internal pressure of the back pressure chamber P and the biasing force of the plate spring 27, the main valve element 3 deflects to separate from the main valve seat 2a. Then, this forms a gap between the main valve element 3 and the sub valve element 2 to open the port 1a. In this embodiment, the inner diameter of the main valve seat 2a is large compared with the inner diameter of the sub valve seat 1b. That is, there is a difference between a pressure-receiving area of the sub valve element 2 to receive the pressure of the port 1a side and a pressure-receiving area of the sub valve element 2 to receive the pressure of the valve-element-between chamber C side. Accordingly, until the differential pressure generated by the restrictive passage 2b reaches the valve opening pressure to separate the sub valve element 2 from the sub valve seat 1b, the sub valve element 2 remains to seat on the sub valve seat 1b.

On the other hand, in a state where the main valve element 3 is deflected to be opened, and when the differential pressure generated by the restrictive passage 2b reaches the valve opening pressure to separate the sub valve element 2 from the sub valve seat 1b, the sub valve element 2 also separates from the sub valve seat 1b to open the port 1a by deflecting the disc spring 4. The intensification ratio in the main valve element 3 is configured to be small compared with the intensification ratio in the sub valve element 2 as a ratio of the valve opening pressure of the sub valve element 2 with respect to the pressure of the valve-element-between chamber C. That is, the pressure inside the rod-side chamber 13 at the opening of the main valve element 3 is low compared with the pressure inside the rod-side chamber 13 at the opening of the sub valve element 2. That is, the valve opening pressure of the main valve element 3 is configured to be low compared with the valve opening pressure of the sub valve element 2.

The sub valve element 2, which is in a state separating from the sub valve seat 1b, when the differential pressure generated by the restrictive passage 2b becomes less than the valve opening pressure, is biased by the disc spring 4 to promptly recover to the state being seated on the sub valve seat 1b. This can surely avoid the occurrence of the delay of closing the port 1a when the expansion and contraction direction of the shock absorber D is changed or similar time. Accordingly, disposing the disc spring 4 can improve the responsiveness of the damping force generation.

On the other end side (right side in FIG. 5) with respect to the screw hole portion 20f in the valve housing 20, a valve housing cylinder 21a of an electromagnetic valve seat member 21 is housed. The electromagnetic valve seat member 21 includes the valve housing cylinder 21a, a circular base portion 21c, a through hole 21d, a circular control valve seat 21e, a ring-shaped protrusion 21f, a cylindrical socket portion 21g, a plurality of cutouts 21h, the through hole 21i, and a vertical groove 21j. The valve housing cylinder 21a is in the shape of a cylinder with a closed bottom, and includes a flange 21b on the outer periphery of the other end side (right end side in FIG. 5). The base portion 21c is disposed on the outer periphery of the flange 21b on the valve housing cylinder 21a. The through hole 21d opens from the side face of the valve housing cylinder 21a in the radial direction to communicate with the inside. The control valve seat 21e projects from the other end (right end in FIG. 5) of the valve housing cylinder 21a in the axial direction. The ring-shaped protrusion 21f is protrudingly disposed toward the valve housing 20 side on the end portion of the valve housing 20 side (left side in FIG. 5) of the base portion 21c to fit to the outer periphery of the ring-shaped protrusion 20i. The socket portion 21g rises from the outer periphery of the base portion 21c to fit to a ring-shaped depressed portion 20k, which is disposed on the outer periphery of the other end (right end in FIG. 5) of the large-diameter pipe portion 20b. The plurality of cutouts 21h are disposed on the end portion of the opposite side (right side in FIG. 5) of the valve housing 20 on the base portion 21c. The through hole 21i passes through the socket portion 21g in the radial direction. The vertical groove 21j is disposed on the outer periphery of the base portion 21c along the axial direction.

The electromagnetic valve seat member 21 is assembled to the valve housing 20, where the valve housing cylinder 21a is inserted into the valve housing 20, the ring-shaped protrusion 21f fits to the outer periphery of the ring-shaped protrusion 20i of the valve housing 20, the socket portion 21g fits to the ring-shaped depressed portion 20k of the valve housing 20, and the base portion 21c is laminated on the other end (right end in FIG. 5) of the large-diameter pipe portion 20b of the valve housing 20. Thus, the electromagnetic valve seat member 21 is assembled to the valve housing 20 to be determined the position with respect to the valve housing 20 in the radial direction.

The ring-shaped protrusion 20i of the valve housing 20 mounts the fail valve element 31 constituted of the circular laminated leaf valve on the outer periphery. The fail valve element 31 is sandwiched by the portion which is the other end (right end in FIG. 5) of the large-diameter pipe portion 20b of the valve housing 20 and is between the ring-shaped protrusion 20i and the ring-shaped window 20h, and the ring-shaped protrusion 21f of the electromagnetic valve seat member 21. This causes the fail valve element 31 to be configured such that the inner periphery is fixed and the outer periphery deflects.

An electromagnetic valve element 22 is inserted into the electromagnetic valve seat member 21 slidably in the axial direction. The electromagnetic valve element 22 includes a small-diameter portion 22a, a large-diameter portion 22b, a circular depressed portion 22c, a flange-like spring bearing portion 22d, a communication passage 22e, an orifice 22f, and a ring-shaped protrusion 22g. The small-diameter portion 22a is disposed on the electromagnetic valve seat member 21 side (left end side in FIG. 5) to be slidably inserted into the valve housing cylinder 21a of the electromagnetic valve seat member 21. The large-diameter portion 22b is housed in the base portion 21c of the electromagnetic valve seat member 21. The depressed portion 22c is disposed between the small-diameter portion 22a and the large-diameter portion 22b. The spring bearing portion 22d is disposed on the outer periphery of the end portion on the opposite side of the electromagnetic valve seat member 21 of the large-diameter portion 22b. The communication passage 22e passes through the electromagnetic valve element 22 from the forward end to the rear end. The orifice 22f is disposed in the middle of the communication passage 22e. The ring-shaped protrusion 22g is disposed on the outer periphery of the end portion on the opposite side of the electromagnetic valve seat member 21 of the spring bearing portion 22d.

The electromagnetic valve element 22 includes the large-diameter portion 22b formed to make the outer diameter of the opposite side of the electromagnetic valve seat member 21 a larger diameter than the small-diameter portion 22a by the depressed portion 22c as a border. The electromagnetic valve element 22 includes a seating portion 22h opposing to the control valve seat 21e on the one end (left end in FIG. 5) of the large-diameter portion 22b. Moving of the electromagnetic valve element 22 in the axial direction with respect to the electromagnetic valve seat member 21 causes the seating portion 22h to seat on and separate from the control valve seat 21e. Thus, the electromagnetic valve element 22 and the electromagnetic valve seat member 21 constitute a pressure control valve PV. Accordingly, the pressure control valve PV is closed when the seating portion 22h seats on the control valve seat 21e.

When the electromagnetic valve element 22 separates most from the electromagnetic valve seat member 21, the electromagnetic valve element 22 causes the through hole 21d to oppose to the small-diameter portion 22a to obstruct the through hole 21d (a state indicated in FIG. 5). When the electromagnetic valve element 22 moves predetermined distance from the position separating most from the electromagnetic valve seat member 21 to the electromagnetic valve seat member 21 side, the electromagnetic valve element 22 constantly causes the depressed portion 22c to oppose to the through hole 21d to open the through hole 21d. Thus, the switching valve SV is formed such that the small-diameter portion 22a of the electromagnetic valve element 22 opens and closes the through hole 21d of the electromagnetic valve seat member 21.

The electromagnetic valve seat member 21 and the electromagnetic valve element 22 constitute the electromagnetic valve EV. The electromagnetic valve EV is formed by integrating the pressure control valve PV and the switching valve SV.

The inside of the valve housing 20 communicates with the rod-side chamber 13, which is the upstream of the port 1a, via the hollow portion 1e of the main valve seat member 1, and communicates with the reservoir 17 via the inside of the electromagnetic valve seat member 21, the cutout 21h, and the vertical groove 21j. The back pressure chamber P communicates with the inside of the valve housing 20 through the pressure introduction vertical hole 20e and the pressure introduction horizontal hole 20d. This ensures the pressure of the rod-side chamber 13 to be reduced through the orifice 1f and guided to the back pressure chamber P.

Accordingly, the pilot passage PP causes the rod-side chamber 13 to communicate with the reservoir 17 other than the route passing through the port 1a. The pilot passage PP is formed by the hollow portion 1e of the main valve seat member 1, the inside of the valve housing 20, the through hole 21d of the electromagnetic valve seat member 21, the inside of the electromagnetic valve seat member 21, the depressed portion 22c of the electromagnetic valve element 22, the cutout 21h, and the vertical groove 21j.

On the end portion of the opposite side of the electromagnetic valve seat member 21 in the spring bearing portion 22d, a perforated disk 32 fitting on the inner periphery of the ring-shaped protrusion 22g is laminated. The communication passage 22e communicates with the back side of the perforated disk 32 (right end side in FIG. 5) through the hole of the perforated disk 32. Between the spring bearing portion 22d and the flange 21b, a coiled spring 33 that biases the electromagnetic valve element 22 to the opposite side of the electromagnetic valve seat member 21 is interposed. The coiled spring 33 constantly biases the electromagnetic valve element 22 to the separating direction from the electromagnetic valve seat member 21. The electromagnetic valve element 22 is determined the position separating most from the electromagnetic valve seat member 21 when the thrust by the solenoid Sol (described later) opposing to the coiled spring 33 does not act. Accordingly, in this state, while the pressure control valve PV is in the opening state, the switching valve SV is in the closing state since the small-diameter portion 22a is opposed to the through hole 21d. Accordingly, the pilot passage PP is shut off. It should be noted that, in this case, while the coiled spring 33 is used to bias the electromagnetic valve element 22 toward the direction to cause the electromagnetic valve element 22 to separate from the electromagnetic valve seat member 21, an elastic body that can provide a biasing force may be employed other than the coiled spring 33.

When the electromagnetic valve element 22 is inserted into the valve housing cylinder 21a of the electromagnetic valve seat member 21, the electromagnetic valve element 22 forms a space K on the forward end side with respect to the through hole 21d in the valve housing cylinder 21a. The space K communicates with the outside of the electromagnetic valve element 22 through the communication passage 22e and the orifice 22f, which are disposed on the electromagnetic valve element 22. This causes the space K to function as a dashpot when the electromagnetic valve element 22 moves in the axial direction (right-left direction in FIG. 5) with respect to the electromagnetic valve seat member 21. Then, the urgent move of the electromagnetic valve element 22 can be reduced, and oscillatory motions of the electromagnetic valve element 22 can be reduced.

If the electromagnetic valve seat member 21 is laminated on the valve housing 20, the inner periphery of the fail valve element 31, which is mounted on the outer periphery of the ring-shaped protrusion 20i of the valve housing 20, is sandwiched by the portion which is the other end of the large-diameter pipe portion 20b of the valve housing 20 (right end in FIG. 5) and is between the ring-shaped protrusion 20i and the ring-shaped window 20h, and the ring-shaped protrusion 21f of the electromagnetic valve seat member 21 to be secured. Thus, fitting the fail valve element 31 to the outer periphery of the ring-shaped protrusion 20i ensures the fail valve element 31 to be determined the position with respect to the valve housing 20 and the electromagnetic valve seat member 21 in the radial direction.

When the fail valve element 31 is sandwiched by the valve housing 20 and the electromagnetic valve seat member 21 to be assembled, the fail valve element 31 is seated on the fail valve seat 20g of the valve housing 20 in a state where an initial deflection is provided. This causes the ring-shaped window 20h to be obstructed. Then, when the fail valve element 31 is deflected by a pressure action from the ring-shaped window 20h side, the fail valve element 31 separates from the fail valve seat 20g. This causes the fail valve element 31 to open the ring-shaped window 20h to cause the groove 20j, which communicates with the inside of the valve housing 20, to communicate with the reservoir 17 through the through hole 21i, which passes through the socket portion 21g of the electromagnetic valve seat member 21. It should be noted that the initial deflection of the fail valve element 31 is configured such that the valve opening pressure of the fail valve FV becomes larger than the largest valve opening pressure of the pressure control valve PV.

As described above, the fail valve element 31 and the fail valve seat 20g constitute the fail valve FV. The groove 20j and the through hole 21i constitute the fail passage FP, which is branched from the pilot passage PP to cause the pilot passage PP to communicate with the reservoir 17. The fail passage FP is branched from the upstream side of the switching valve SV in the pilot passage PP to communicate with the reservoir 17. Since the fail passage FP is formed by disposing the groove 20j on the electromagnetic valve seat member 21 side of the valve housing 20, the processing of the fail passage FP is considerably facilitated. Instead of the groove 20j, a hole may cause the ring-shaped window 20h to communicate with the valve housing 20.

As described above, the damping valve V uses the port 1a as a main passage to cause the rod-side chamber 13 to communicate with the reservoir 17. The port 1a is opened and closed by the main valve MV including the main valve element 3, and the port 1a is also opened by the sub valve element 2 after opening the port 1a by the main valve element 3. Thus, the damping valve V opens the port 1a in two stages.

Other than the route passing through the port 1a, the rod-side chamber 13 is communicated with the reservoir 17 through the pilot passage PP constituted of the hollow portion 1e of the main valve seat member 1, the inside of the valve housing 20, the through hole 21d of the electromagnetic valve seat member 21, the inside of the electromagnetic valve seat member 21, the depressed portion 22c of the electromagnetic valve element 22, the cutout 21h, and the vertical groove 21j.

The pilot passage PP is communicated with the back pressure chamber P through the pressure introduction horizontal hole 20d and the pressure introduction vertical hole 20e of the valve housing 20. The orifice 1f, which is disposed in the middle of the pilot passage PP, reduces the pressure of the upstream of the port 1a to introduce to the back pressure chamber P. The pressure control valve PV opens and closes the pilot passage PP. The pilot passage PP can adjust the valve opening pressure of the pressure control valve PV to control the pressure inside the back pressure chamber P. The pilot passage PP includes the solenoid Sol that provides the thrust to the electromagnetic valve element 22 to adjust the valve opening pressure of the pressure control valve PV. The electromagnetic valve EV is constituted such that the switching valve SV is integrated into the pressure control valve PV. The pilot passage PP is opened and closed by the switching valve SV disposed on the upstream of the pressure control valve PV.

In a state where the solenoid Sol is not energized or cannot be energized, the electromagnetic valve element 22 is biased by the coiled spring 33, and the electromagnetic valve element 22 separates from the electromagnetic valve seat member 21 to be positioned on the stroke end. At this time, while the pressure control valve PV becomes in the opening state, the switching valve SV becomes in the shutoff state because the small-diameter portion 22a is opposed to the through hole 21d. This causes the pilot passage PP to be shut off. In a state where the pilot passage PP is shut off, when the pressure of the upstream side of the switching valve SV in the pilot passage PP is increased to reach the valve opening pressure of the fail valve element 31, the fail valve element 31 separates from the fail valve seat 20g. This ensures the pilot passage PP to communicate with the reservoir 17 through the fail passage FP. It should be noted that the valve opening pressure of the fail valve FV is configured to be larger than the largest valve opening pressure of the pressure control valve PV in a state where the solenoid Sol of the electromagnetic valve EV can be normally energized. Accordingly, in the normal time, the fail valve FV is configured not to open.

The solenoid Sol includes a circular solenoid bobbin 39, a first fixed iron core 40, a second fixed iron core 41, a ring 42, a movable iron core 43, and a shaft 44. The solenoid bobbin 39 is wound around by a winding wire 38 and fixed by a cap 35 in the axial direction. The first fixed iron core 40 is in the shape of a cylinder with a closed bottom and is fitted to the inner periphery of the solenoid bobbin 39. The second fixed iron core 41 is in the shape of a cylinder and houses the solenoid bobbin 39. The ring 42 is interposed between the first fixed iron core 40 and the second fixed iron core 41 to form a magnetical void. The movable iron core 43 is in the shape of a cylinder and disposed on the inner peripheral side of the first fixed iron core 40. The shaft 44 is secured to the inner periphery of the movable iron core 43.

The second fixed iron core 41 includes an outer pipe portion 41a, an inner pipe portion 41b, an annular plate portion 41c, and a sleeve 41d. The outer pipe portion 41a houses the solenoid bobbin 39. The inner pipe portion 41b fits to the inner periphery of the solenoid bobbin 39. The annular plate portion 41c connects the one end (left end in FIG. 5) of the outer pipe portion 41a with the one end (left end in FIG. 5) of the inner pipe portion 41b. The sleeve 41d rises from the annular plate portion 41c, and a screw groove is disposed on the outer periphery of the sleeve 41d. On the second fixed iron core 41, the sleeve 41d is screwed on the inner periphery of a sleeve 18a disposed on the opening of the outer pipe 18 to be secured to the outer pipe 18. It should be noted that the outer periphery of the solenoid bobbin 39 is covered with mold resin (not illustrated), and the solenoid bobbin 39 is fitted between the outer pipe portion 41a and the inner pipe portion 41b of the second fixed iron core 41.

On the opening end of the outer pipe portion 41a, the cap 35 is secured by crimping this opening end. The cap 35 is formed to be ring-shaped, and the end portion of the first fixed iron core 40 is secured to the inner periphery of the cap 35. Thus, if the cap 35 is secured to the second fixed iron core 41, the first fixed iron core 40, the ring 42, and the solenoid bobbin 39 are housed in the second fixed iron core 41 to be secured.

The movable iron core 43 is formed in a cylindrical shape, and on the inner periphery of the movable iron core 43, the shaft 44 extending from both ends of the movable iron core 43 in the axial direction (right-left direction in FIG. 5) is mounted. The shaft 44 is held movably in the axial direction by a circular bush 45 and a circular bush 47. The bush 45 is disposed on the bottom portion of the first fixed iron core 40. The bush 47 is held on the inner periphery of a circular guide 46 fitting to the inner periphery of the inner pipe portion 41b of the second fixed iron core 41. The bushes 45 and 47 guide the shaft 44 to move in the axial direction.

When the second fixed iron core 41 is secured to the sleeve 18a of the outer pipe 18, the guide 46 fitted to the inner periphery of the second fixed iron core 41 abuts on the electromagnetic valve seat member 21, and secure the electromagnetic valve seat member 21, the valve housing 20, and the main valve seat member 1 to the shock absorber D. Even if the guide 46 abuts on the other end (right end in FIG. 5) of the electromagnetic valve seat member 21, the downstream of the switching valve SV in the pilot passage PP is constantly communicated with the reservoir 17 by the cutout 21h. Accordingly, the move of the electromagnetic valve element 22 is not prevented such that the downstream side of the switching valve SV of the pilot passage PP is closed.

The one end (left end in FIG. 5) of the shaft 44 abuts on the perforated disk 32 fitting to the other end (right end in FIG. 5) of the electromagnetic valve element 22. The biasing force of the coiled spring 33 also acts to the shaft 44 via the electromagnetic valve element 22. The coiled spring 33 biases not only the electromagnetic valve element 22, but also the shaft 44 as one component of the solenoid Sol.

As described above, the solenoid Sol is configured such that a magnetic path passes through the first fixed iron core 40, the movable iron core 43, and the second fixed iron core 41. When the winding wire 38 is excited, the movable iron core 43, which is disposed biased to the first fixed iron core 40, is pulled to the second fixed iron core 41 side. This causes the thrust toward the one end side (left side in FIG. 5) to act to the movable iron core 43.

The shaft 44 integrally moves with the movable iron core 43, as illustrated in FIG. 5, abuts on the electromagnetic valve element 22 of the electromagnetic valve EV. Then, the thrust of the solenoid Sol is transmitted to the electromagnetic valve element 22. While the solenoid Sol is excitated, the thrust in the direction toward the one end side (left side in FIG. 5) can be provided to the electromagnetic valve element 22 via the pulled movable iron core 43. Adjusting the energization amount of the solenoid Sol to the winding wire 38 ensures to adjust the thrust provided to the electromagnetic valve element 22 to control the valve opening pressure of the pressure control valve PV.

Specifically, when the current is supplied to the solenoid Sol to cause the thrust to act to the electromagnetic valve element 22, the electromagnetic valve element 22 of the pressure control valve PV overcomes the thrust of the solenoid Sol and the biasing force of the coiled spring 33 to be pressed to the control valve seat 21e. When the pressure of the upstream side of the pilot passage PP acts to the electromagnetic valve element 22, and the resultant force of the force to separate the electromagnetic valve element 22 from the control valve seat 21e by the pressure and the biasing force of the coiled spring 33 exceeds the thrust of the solenoid Sol, the pressure control valve PV opens to open the pilot passage PP. That is, when the pressure of the upstream side of the pilot passage PP reaches the valve opening pressure, the pressure control valve PV opens to open the pilot passage PP.

Thus, adjusting the thrust of the solenoid Sol depending on the amount of the current supplied to the solenoid Sol ensures to adjust the magnitude of the valve opening pressure of the pressure control valve PV. When the pressure control valve PV opens, the pressure of the upstream side of the pressure control valve PV in the pilot passage PP is equal to the valve opening pressure of the pressure control valve PV. The pressure of the back pressure chamber P to which the pressure of the upstream side to the pressure control valve PV of the pilot passage PP is introduced is also controlled to be equal to the valve opening pressure of the pressure control valve PV.

Next, a description will be given of the performance of the damping valve V.

When the shock absorber D expands and contracts to discharge the hydraulic oil from the rod-side chamber 13 to the discharge passage 15, the hydraulic oil in the discharge passage 15 is discharged to the reservoir 17 through the damping valve V. At this time, in the damping valve V, the pressure of the port 1a and the upstream of the pilot passage PP increase. In the case where the damping valve V normally performs, when the current is supplied to the solenoid Sol to adjust the valve opening pressure of the pressure control valve PV of the electromagnetic valve EV, the pressure between the orifice 1f and the pressure control valve PV in the pilot passage PP is introduced to the back pressure chamber P.

The internal pressure of the back pressure chamber P is controlled to be equal to the valve opening pressure of the pressure control valve PV. Adjusting the valve opening pressure of the pressure control valve PV by the solenoid Sol ensures to adjust the pressure that acts to the back surface of the main valve element 3. This controls the valve opening pressure of the sub valve element 2 to open the port 1a.

Specifically, when the pressure in the rod-side chamber 13 increases the pressure in the valve-element-between chamber C, and the force to deflect the outer periphery of the main valve element 3 toward an opening direction (rightward in FIG. 5) overcomes the internal pressure of the back pressure chamber P and the biasing force by the plate spring 27, the main valve element 3 deflects to separate from the main valve seat 2a. This forms a gap between the main valve element 3 and the sub valve element 2 to open the port 1a. Accordingly, adjusting the magnitude of the pressure in the back pressure chamber P ensures to adjust the magnitude of the pressure of the valve-element-between chamber C as the pressure to separate the main valve element 3 from the main valve seat 2a. That is, depending on the amount of the current provided to the solenoid Sol, the pressure where the main valve element 3 separates from the sub valve element 2 can be controlled.

Figure 6:
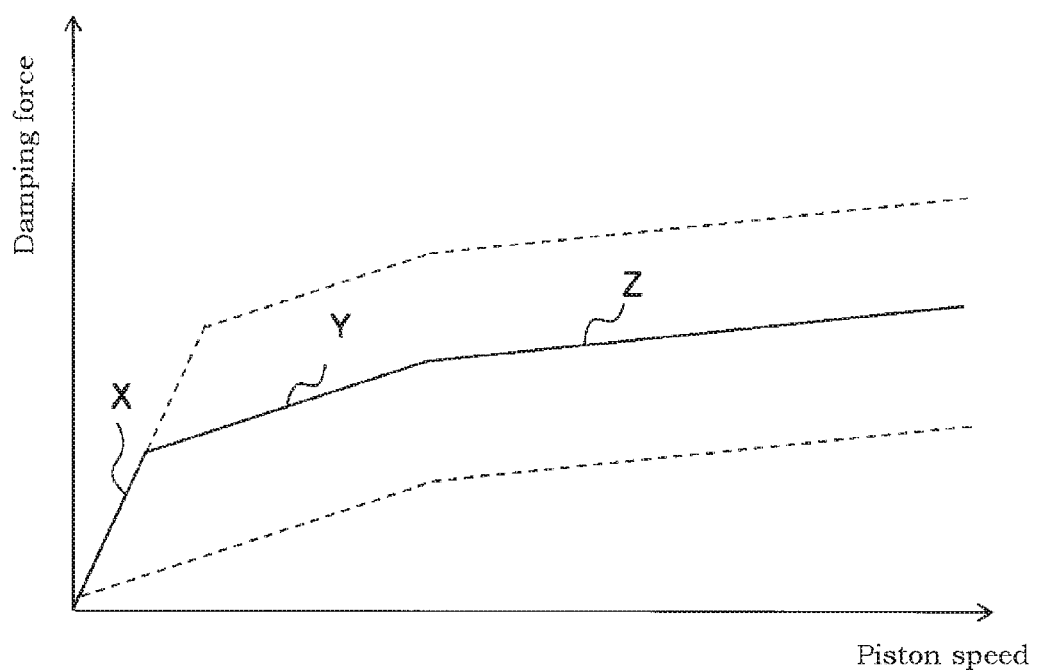
FIG. 6 is a diagram illustrating attenuation characteristics of the shock absorber to which the damping valve according to the embodiment of the present invention is applied.

Accordingly, the attenuation characteristics (characteristics of damping force with respect to piston speed) of the damping valve V is illustrated in FIG. 6. That is, until the main valve element 3 opens, the characteristic has a constant inclination (a state indicated by a line X in FIG. 6) because the hydraulic oil passes through a sliding gap and the cutout orifice 3a of the damping valve V. When the main valve element 3 separates from the main valve seat 2a to open the port 1a, the inclination is decreased (a state indicated by a line Y in FIG. 6). Then, a damping coefficient is decreased compared with before the main valve element 3 opens.

As described above, the valve opening pressure of the main valve element 3 is small compared with the valve opening pressure of the sub valve element 2 because the intensification ratio in the main valve element 3 is configured to be small compared with the intensification ratio in the sub valve element 2. Until the differential pressure generated by the restrictive passage 2b reaches the valve opening pressure to separate the sub valve element 2 from the sub valve seat 1b, the sub valve element 2 remains to seat on the sub valve seat 1b.

On the other hand, when the piston speed of the shock absorber D increases in a state where the main valve element 3 deflects to be opened, and the differential pressure generated by the restrictive passage 2b reaches the valve opening pressure to separate the sub valve element 2 from the sub valve seat 1b, the sub valve element 2 also separates from the sub valve seat 1b to open the port 1a. Then, the flow passage area is increased because the sub valve element 2 separates from the sub valve seat 1b to cause the port 1a to be directly communicated with the reservoir 17 without passing through the restrictive passage 2b, with respect to a case where the port 1a is communicated with the reservoir 17 passing through only the restrictive passage 2b in a state where only the main valve element 3 is opened. Accordingly, the attenuation characteristics of the damping valve V has a small inclination compared with a case where only the main valve element 3 is opened (a state indicated by a line Z in FIG. 6). Then, the damping coefficient is further decreased compared with the state where the main valve element 3 only opens.

Adjusting the energization amount to the solenoid Sol to increase and decrease the valve opening pressure of the pressure control valve PV ensures to vary the attenuation characteristics of the damping valve V as moving the lines Y and Z to upper or lower within a range indicated by a pair of dashed lines in FIG. 6. Thus, adjusting the energization amount to the solenoid Sol to increase and decrease the valve opening pressure of the pressure control valve PV ensures to control the magnitude of the valve opening pressure when the main valve element 3 separates from the main valve seat 2a of the sub valve element 2 to open the port 1a, that is, the pressure of the valve-element-between chamber C when the main valve element 3 opens the port 1a. Further, this also ensures to control the magnitude of the valve opening pressure of the sub valve element 2 when the sub valve element 2 separates from the sub valve seat 1b (the differential pressure between the pressure on the front side of the sub valve element 2 and the pressure of the valve-element-between chamber C).

The intensification ratio in the main valve element 3 can be decreased compared with the intensification ratio in the sub valve element 2. This causes the valve opening pressure of the main valve element 3 to be decreased compared with the valve opening pressure of the sub valve element 2 to relief the port 1a with two stages. Accordingly, the damping valve V ensures to decrease the damping force at low speed at the time of fully soft where the valve opening pressure of the pressure control valve PV is minimum compared with a conventional damping valve. Then, the variable range of the damping force can be increased.

Accordingly, the damping valve V ensures to output a soft damping force in the case where the piston speed of the shock absorber D is in the low speed range, and prevents the damping force from the excess. The damping valve V ensures to enhance the upper limit of a hard damping force required in the case where the piston speed of the shock absorber D is in the high speed range, and prevent the damping force from the shortage. Then, applying the damping valve V to the shock absorber D ensures to enhance the variable range of the damping force and improve the vehicular ride quality.

On the damping valve V, the fail passage FP is branched from the downstream of the orifice 1f and the upstream of the switching valve SV in the pilot passage PP to pass to the reservoir 17. In the middle of the fail passage FP, the fail valve FV is disposed. The pressure on the downstream side of the orifice 1f in the pilot passage PP acts on the fail valve FV in the opening direction. The valve opening pressure of the fail valve FV is configured by the initial deflection of the fail valve element 31.

Accordingly, in the fail state, even if the pilot passage PP is shut off by the switching valve SV, the fail valve FV provides the relief function to control the pressure on the downstream of the orifice 1f and the upstream of the switching valve SV in the pilot passage PP to be the valve opening pressure of the fail valve FV. Then, in the failing, the back-pressure guided to the back pressure chamber P is controlled to be the valve opening pressure of the fail valve FV, and the valve opening pressures of the main valve element 3 and the sub valve element 2 are also controlled to the predetermined pressure. Accordingly, even in the failing, the damping valve V can provide the resistance to the flow of the hydraulic oil passing through the main valve MV to provide the damping force.

The above-described embodiment provides the following operational advantages.

On the damping valve V, controlling the electromagnetic valve EV and adjusting the back-pressure acting on the main valve MV ensure to vary the damping force. On the damping valve V, the switching valve SV is disposed on the upstream of the pressure control valve PV in the pilot passage PP, and the fail passage FP is branched from the upstream of the switching valve SV. Then, even if the switching valve SV and the pressure control valve PV are integrated, the pressure on the back side of the pressure control valve PV is not caused to be raised by the switching valve SV. This prevents the pressure control valve PV from being biased to the opening direction by the pressure on the back side of the pressure control valve PV, and prevents the switching valve SV from shutting off the pilot passage PP. Even if the switching valve SV is disposed on the upstream of the pressure control valve PV in the pilot passage PP, since the fail passage FP is branched from the upstream of the switching valve SV, the fail passage FP works effectively and does not lose the fail function.

Accordingly, the damping valve V ensures avoiding uncontrollability of the damping force when transferring to the fail state in the normal time.

On the damping valve V, the pressure control valve PV and the fail valve FV are arranged in parallel. Then, the valve opening pressure of the fail valve FV is made larger than the upper limit pressure that the pressure control valve PV can control. Then, the high damping force can be provided in the failing. Accordingly, the vehicle body posture in the failing can be stabilized more.

On the damping valve V, the valve opening pressure of the fail valve FV is made larger than the upper limit pressure that the pressure control valve PV can control. Then, if the damping force becomes excessive in the region where the piston speed of the shock absorber D is low, when the electromagnetic valve element 22 stops at the position separating most from the electromagnetic valve seat member 21, it is only necessary that the depressed portion 22c slightly opposes the through hole 21d. This ensures the switching valve SV to function as the throttle in the shutoff state. In this manner, until the main valve MV opens, the hydraulic oil can bypass the main valve MV, pass the switching valve SV functioning as the throttle, and move to the reservoir 17 from the rod-side chamber 13. Accordingly, in the attenuation characteristics in the failing, the throttle property can be added in the region where the piston speed of the shock absorber D is low. Accordingly, even in the failing, the vehicular ride quality can be improved.

Figure 7:
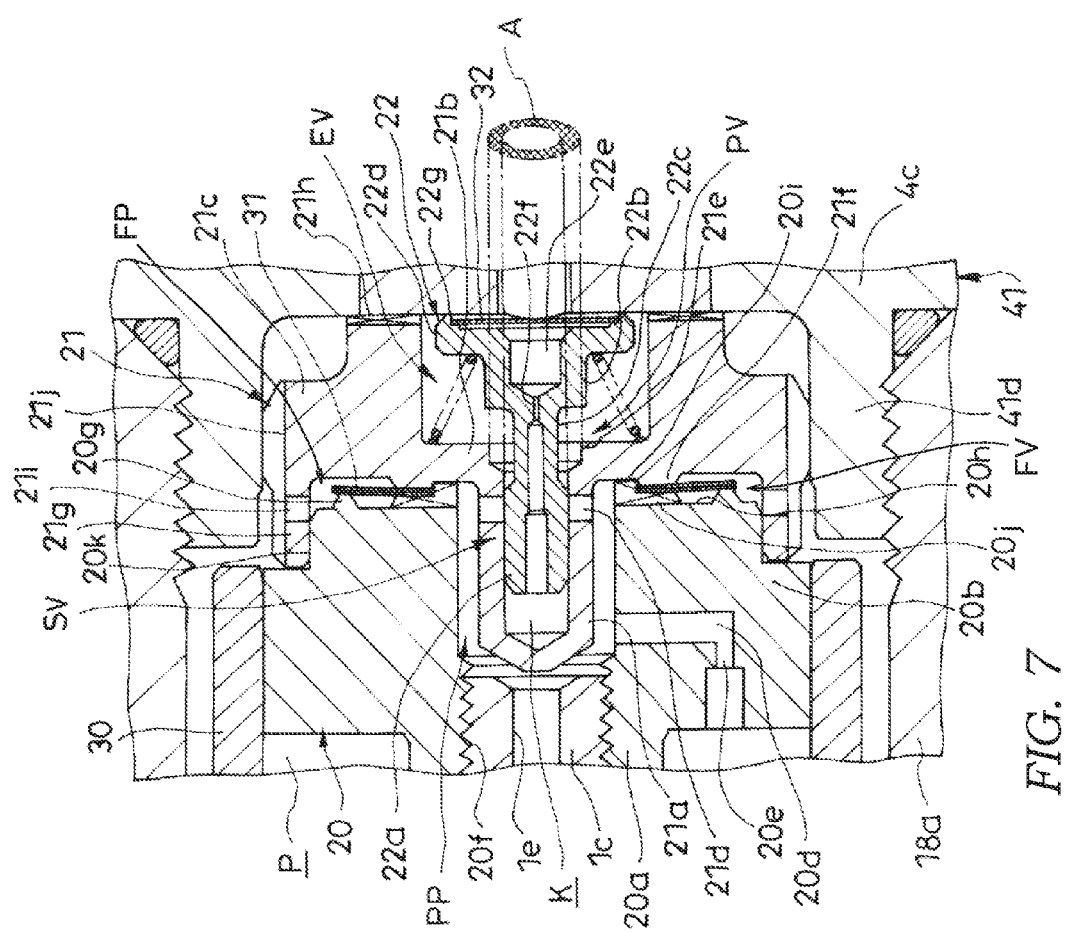
FIG. 7 is a partially enlarged cross-sectional view illustrating the specific configuration of the damping valve according to the embodiment of the present invention.

In this embodiment, the pressure control valve PV includes the electromagnetic valve element 22. The electromagnetic valve element 22 includes the electromagnetic valve seat member 21, the small-diameter portion 22a, the large-diameter portion 22b, and the depressed portion 22c. The electromagnetic valve seat member 21 includes the valve housing cylinder 21a including the through hole 21d, which is formed in a pipe shape and communicates with the inside and outside, and the circular control valve seat 21e disposed on the end portion of the valve housing cylinder 21a. The small-diameter portion 22a is slidably inserted into the valve housing cylinder 21a. The large-diameter portion 22b is formed to a larger diameter compared with the small-diameter portion 22a. The depressed portion 22c is disposed between the small-diameter portion 22a and the large-diameter portion 22b to be able to oppose the through hole 21d. The electromagnetic valve element 22 is configured such that the end portion of the large-diameter portion 22b of the electromagnetic valve element 22 seats on and separates from the control valve seat 21e. Accordingly, as illustrated in FIG. 7, the pressure control valve PV can reduce a pressure-receiving area A to which the pressure acts in the direction that the electromagnetic valve element 22 exits from the electromagnetic valve seat member 21. Then, with decreasing the pressure-receiving area A, the pressure control valve PV can increase the flow passage area when the valve is opened.

Figure 8:
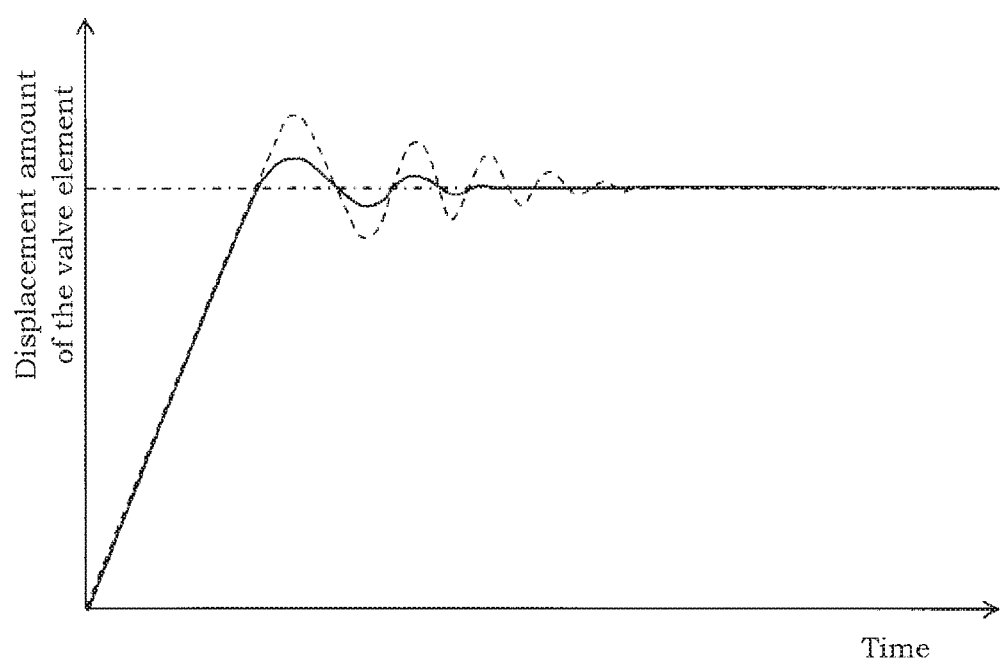
FIG. 8 is a diagram illustrating a time transition of displacement amount of the valve element of an electromagnetic valve after opening a pressure control valve.

Here, when the pressure control valve PV is simply a poppet valve opening and closing the port, the amount of the flow passage area is smaller than the valve opening amount of the pressure control valve PV. Then, the distance of the pressure control valve PV to separate from the valve seat easily increases. Accordingly, as indicated by a dashed line in FIG. 8, it takes a long time for the valve element to be stabilized on the position statically balancing (the position indicated by a one dot chain line in FIG. 8) after the pressure control valve PV is opened. Remarkable appearance of the overshooting occurs rapid variation of the generated damping force to require a long time to stabilize the damping force.

In contrast to this, the pressure control valve PV according to this embodiment ensures to decrease the pressure-receiving area that receives the pressure to cause the electromagnetic valve element 22 to separate from the control valve seat 21e, and ensures to increase the flow passage area with respect to the distance of the electromagnetic valve element 22 to separate from the control valve seat 21e. Then, as indicated by a solid line in FIG. 8, the time for the electromagnetic valve element 22 to converge to the statically balancing position can be reduced without upsizing an actuator such as the solenoid Sol. This reduces the rapid variation of the damping force without upsizing the damping valve V. Accordingly, the stable damping force with good responsiveness can be provided.

Figure 9:
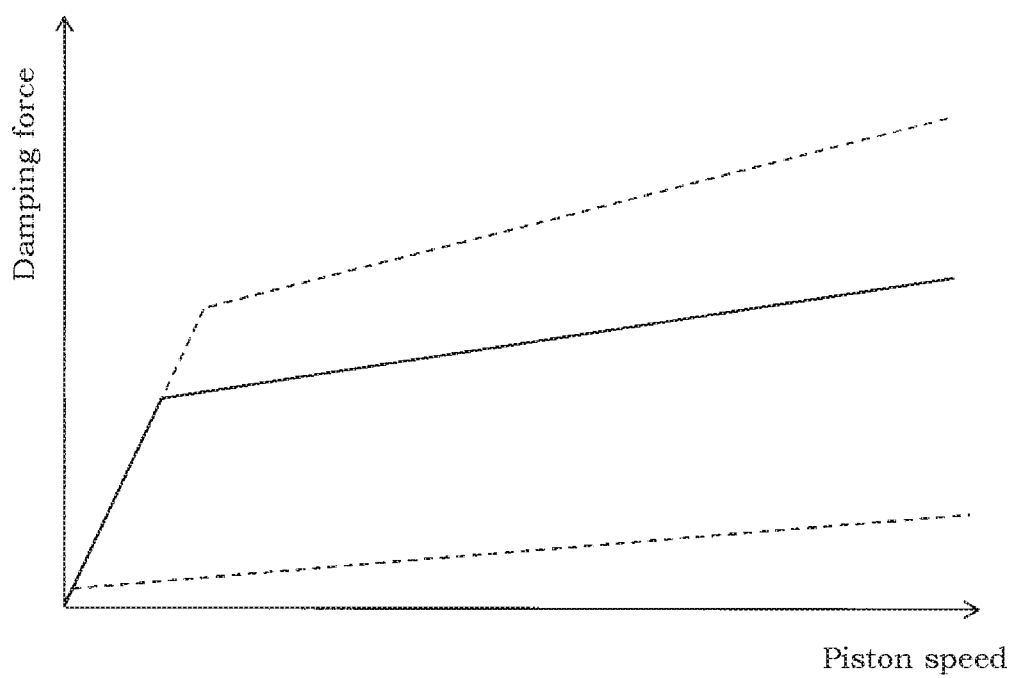
FIG. 9 is a diagram illustrating the attenuation characteristics of the shock absorber to which the damping valve according to the modification of the embodiment of the present invention is applied.

It should be noted that, as described above, in this embodiment, laminating the sub valve element 2 on the main valve seat member 1 and laminating the main valve element 3 on the sub valve element 2 ensure the port 1a to open in two stages. Not limited to this, the configuration where the sub valve element 2 is eliminated, the main valve element 3 is directly laminated on the sub valve seat 1b of the main valve seat member 1, the spool 30 is abutted on the back side of the main valve element 3, and the main valve element 3 is biased toward the main valve seat 2a by the pressure of the back pressure chamber P is obviously possible. In this manner, since the main valve element 3 only opens the port 1a, the damping valve V causes the shock absorber D to provide the attenuation characteristics as illustrated in FIG. 9.

On the damping valve V, the thrust corresponding to the current supplied to the solenoid Sol is provided to the pressure control valve PV to control the internal pressure of the back pressure chamber P for adjusting the valve opening pressure of the sub valve element 2 and the main valve element 3. This ensures to adjust the internal pressure of the back pressure chamber P as desired without depending on the flow rate passing through the pilot passage PP. Then, even in the case where the piston speed of the shock absorber D is in a low region, because the damping force variation with respect to the supply current to the solenoid Sol shows a nearly linear shape, the controllability can be improved. Providing the thrust corresponding to the amount of the supply current to the solenoid Sol to the pressure control valve PV controls the internal pressure of the back pressure chamber P to bias the main valve element 3. Then, the variation of the damping force can be decreased.

It should be noted that, in the case of this embodiment, the solenoid Sol is configured to control the pressure in the back pressure chamber P to control the valve opening pressure of the sub valve element 2 and the main valve element 3. Not limited to this, to drive the electromagnetic valve element 22, an actuator other than the solenoid Sol can be used.

The sub valve element 2 is laminated in a floating state with respect to the main valve seat member 1. This ensures the port 1a to be widely opened, and ensures a damping coefficient to be decreased when the sub valve element 2 is opened. This realizes the very simple damping force control by the solenoid Sol.

The main valve element 3 is a circular leaf valve, which inner periphery is secured to the main valve seat member 1, and which outer periphery seats on and separates from the main valve seat 2a. The main valve element 3 helps the sub valve element 2 to return to the position where the sub valve element 2 seats on the sub valve seat 1b after the main valve element 3 biases the sub valve element 2 and the sub valve element 2 opens the port 1a. This ensures the disc spring 4 helping the recovery of the sub valve element 2 to be omitted. However, disposing the disc spring 4 avoids the occurrence of the delay of closing the port 1a when the expansion and contraction direction of the shock absorber D is changed or similar time. Then, the responsiveness of the damping force generation of the shock absorber D is improved. It should be noted that the main valve element 3, such as the sub valve element 2 according to this embodiment other than the leaf valve, can be formed in a disk shape to be mounted to the main valve seat member 1 in a floating state.

In the damping valve V, the sub valve seat 1b is formed in ring-shaped and the inner diameter of the main valve seat 2a is set large compared with the inner diameter of the sub valve seat 1b. This ensures to provide a state where the sub valve element 2 does not open even if the main valve element 3 opens. Then, the damping valve V has the attenuation characteristics to surely relief in two stages. Both the sub valve seat 1b and the main valve seat 2a are formed in ring-shaped, then, the intensification ratio of the sub valve element 2 can be easily designed. It should be noted that, while forming the sub valve seat 1b and the main valve seat 2a in ring-shaped ensures the simple designing of the intensification ratio, the sub valve seat 1b and the main valve seat 2a are not limited to the ring-shape, and may be formed in any shape.

In this embodiment, the damping valve V includes the back pressure chamber P disposed on the opposite side of the main valve seat of the main valve element 3, and the pressure in the back pressure chamber P biases the main valve element 3. This prevents the valve opening pressure of the main valve element 3 from varying by each product in the dimension management of the member to form the back pressure chamber P. Then, the stable biasing force can be provided to the main valve element 3, and the large biasing force can be provided to the main valve element 3.

It should be noted that, in the case of this embodiment, the throttle disposed on the pilot passage PP as the orifice 1f reduces the pressure on the upstream of the port 1a to introduce to the back pressure chamber P. However, other than the orifice, the other throttle such as a choke may be employed to reduce the pressure.

Although an embodiment of the present invention has been described, the embodiment is merely one of application examples of the present invention and by no means limits the technical scope of the present invention to a specific configuration of the above-mentioned embodiment.

This application claims priority to Japanese Patent Application No. 2013-191336 filed in the Japanese Patent Office on Sep. 17, 2013, the entire contents of which are incorporated by reference herein.

The invention claimed is:

1. A damping valve, comprising:
   a main passage;
   a main valve disposed on the main passage, the main valve being configured to open and close the main passage;
   a pilot passage including a throttle, the pilot passage being configured to reduce a pressure on an upstream of the main passage to guide as a back-pressure to bias the main valve to a closing direction;
   an electromagnetic valve including a pressure control valve and a switching valve, the electromagnetic valve being controlled by a single solenoid, the pressure control valve being disposed on a downstream of the throttle in the pilot passage to control the back-pressure, the switching valve being integrally disposed with the pressure control valve to open and close the pilot passage;
   a fail passage branched from the downstream of the throttle in the pilot passage, the fail passage bypassing the main valve; and
   a fail valve disposed on the fail passage, the fail valve being configured to open and close the fail passage, wherein
   the switching valve is disposed on an upstream of the pressure control valve in the pilot passage, and
   the fail passage is branched from an upstream of the switching valve in the pilot passage.

2. The damping valve according to claim 1, wherein a valve opening pressure of the fail valve is larger than an upper limit pressure that is controllable by the pressure control valve.

3. The damping valve according to claim 1, wherein the switching valve functions as a throttle when being switched to a shutoff position.

4. The damping valve according to claim 1, wherein the electromagnetic valve, comprises:
   an electromagnetic valve seat member including a valve housing cylinder and a circular control valve seat, the valve housing cylinder being formed in a pipe shape and including a through hole communicating an inside and outside to form a part of the pilot passage, the control valve seat being disposed on an end portion of the valve housing cylinder, and
   an electromagnetic valve element including a small-diameter portion, a large-diameter portion, and a depressed portion, the small-diameter portion being slidably inserted into the valve housing cylinder, the large-diameter portion being formed to a larger diameter compared with the small-diameter portion, the depressed portion being disposed between the small-diameter portion and the large-diameter portion, the depressed portion being configured to be disposed to oppose the through hole, wherein
   the switching valve is formed such that the small-diameter portion opens and closes the through hole, and
   the pressure control valve is formed such that an end portion of the large-diameter portion is seated on and separated from the control valve seat.

5. The damping valve according to claim 4, further comprises:

a cylindrical valve housing housing the valve housing cylinder of the electromagnetic valve seat member, wherein the electromagnetic valve seat member includes the valve housing cylinder and a circular base portion, the base portion being disposed on an outer periphery of the valve housing cylinder, the base portion being internally houses the large-diameter portion of the electromagnetic valve element, the fail valve includes a circular fail valve seat and a fail valve element, the fail valve seat being disposed on one end of the valve housing, the fail valve element being sandwiched by the valve housing and the electromagnetic valve seat member to be seated on and separated from the fail valve seat, and the fail passage is disposed on the valve housing to open to an inner peripheral side of the fail valve seat.

* * * * *